(12) United States Patent
Wu et al.

(10) Patent No.: US 7,984,694 B2
(45) Date of Patent: Jul. 26, 2011

(54) ANIMAL FEEDER

(75) Inventors: Kuo-Eng Wu, Taipei (TW); Jyh-Ren Yan, Hsinchu (TW); Horng-Ji Chen, Hsinchu (TW)

(73) Assignee: Claridy Solutions, Inc., Taipei (TW)

( * ) Notice: Subject to any disclaimer, the term of this patent is extended or adjusted under 35 U.S.C. 154(b) by 589 days.

(21) Appl. No.: 12/048,383

(22) Filed: Mar. 14, 2008

(65) Prior Publication Data

US 2009/0173282 A1 Jul. 9, 2009

(30) Foreign Application Priority Data

Jan. 3, 2008 (TW) ................................. 97100203 A (51) Int. Cl.
*A01K 5/02* (2006.01)
(52) U.S. Cl. .................. 119/51.02; 119/52.4; 119/56.1; 222/144; 222/144.5; 222/370; 222/55; 222/368
(58) Field of Classification Search .................. 119/52.4, 119/56.1; 222/144, 144.5, 368, 370, 55
See application file for complete search history.

(56) References Cited

U.S. PATENT DOCUMENTS

| | | | | |
|---|---|---|---|---|
| 1,883,460 A | * | 10/1932 | Ayars | 141/94 |
| 3,129,853 A | * | 4/1964 | Hoskins | 222/339 |
| 3,340,851 A | * | 9/1967 | Frank et al. | 119/51.13 |
| 3,991,908 A | * | 11/1976 | Thomas et al. | 221/154 |
| 4,162,868 A | * | 7/1979 | Stapleton et al. | 414/9 |
| 4,422,409 A | * | 12/1983 | Walker et al. | 119/51.11 |
| 4,528,848 A | * | 7/1985 | Hafner | 73/218 |
| 5,483,923 A | * | 1/1996 | Sabbara | 119/51.11 |
| 6,367,417 B1 | * | 4/2002 | Gal et al. | 119/51.5 |
| 6,427,628 B1 | * | 8/2002 | Reece | 119/51.11 |
| 6,681,718 B1 | * | 1/2004 | McIlarky | 119/53 |
| 6,701,866 B1 | * | 3/2004 | Shieh | 119/51.11 |
| 6,789,503 B1 | * | 9/2004 | Gao | 119/51.11 |
| 6,988,465 B2 | * | 1/2006 | Park | 119/51.12 |
| 7,228,816 B2 | * | 6/2007 | Turner et al. | 119/51.02 |
| 2003/0062003 A1 | * | 4/2003 | Voogd et al. | 119/521 |
| 2005/0217591 A1 | * | 10/2005 | Turner et al. | 119/51.02 |
| 2005/0252457 A1 | * | 11/2005 | Morosin et al. | 119/51.13 |
| 2007/0113792 A1 | * | 5/2007 | Van Den Berg | 119/56.1 |
| 2007/0193524 A1 | * | 8/2007 | Turner et al. | 119/51.02 |
| 2007/0194056 A1 | * | 8/2007 | Webster et al. | 222/370 |
| 2008/0054014 A1 | * | 3/2008 | Webster et al. | 222/1 |

* cited by examiner

*Primary Examiner* — Rob Swiatek
*Assistant Examiner* — Justin Benedik
(74) *Attorney, Agent, or Firm* — WPAT, PC; Justin King (57) ABSTRACT

An animal feeder includes at least one fodder bin, a fodder mixing device, a control module, a radio frequency identification (RFID) system and an audio frequency device. The fodder bin is provided for storing and outputting fodder. The fodder mixing device is provided for controlling the output of fodder in the fodder bin. The control module is provided for controlling the operation of the animal feeder. The radio frequency identification (RFID) system includes at least one electronic tag and at least one reader. The electronic tag is tagged onto animals. The reader is installed at the control module. The audio frequency device is provided for inputting and outputting an audio frequency. The aforementioned elements constitute an animal feeder that can provide fodders to a specific animal, issue a calling audio frequency, and controlling a fixed quantity of different fodders outputted at a fixed time.

11 Claims, 8 Drawing Sheets

ANIMAL FEEDER

FIELD OF THE INVENTION

The present invention relates to an animal feeder, more particularly to an animal feeder capable of providing fodders to a specific animal, issuing a calling audio frequency sound, and outputting a fixed quantity of different fodders at a fixed time.

BACKGROUND OF THE INVENTION

As pet raising becomes popular in recent years, pet animals regardless of cats, dogs, mini pigs or rabbits are taken care and fed at a fixed time by pet owners. However, pet owners are engaged with their busy life including the activities in school or work, and thus pet owners are usually lack of time to take good care of their pet animals. Some pet owners send their pets to the pet shop when they are busy, and some use a common automatic feeder available in the market for storing fodder and outputting fodders at a predetermined time to feed their pets. The automatic feeders of this sort provide a convenient way of feeding pets, but these feeders still have the following drawbacks:

1. No correspondence relation exists between an automatic feeder and pet animals. If a pet owner has several pets, the pets may fight for the fodder, and thus some pets may have insufficient food and lack of nutrition, while some may have excessive food and become overweighed.

2. The automatic feeder delivers the fodder at a predetermined time. If a pet animal is far away from the feeder, the pet animal may miss the time for a meal, or the pet animal may eat two meals at a time after the feeder delivers the fodder of the next meal. As a result, the animals cannot have meals normally.

3. The automatic feeder can provide only one type of fodder, and thus it cannot provide a balance diet to animals.

SUMMARY OF THE INVENTION

Therefore, it is a primary objective of the present invention to overcome the shortcomings of the prior art by providing an animal feeder that can provide fodders to a specific animal, issue a calling audio frequency, and control the output of a fixed quantity of fodder at a fixed time.

To achieve the foregoing objective, the present invention provides an animal feeder, comprising at least one fodder bin, a fodder mixing device, a control module, a radio frequency identification (RFID) system and an audio frequency device, wherein the fodder bin is capable of storing and outputting a fodder; the fodder mixing device is provided for controlling the output of the fodder in the fodder bin; the control module is capable of controlling the operation of the animal feeder; the radio frequency identification (RFID) system comprises at least one electronic tag and at least one reader, and the electronic tag is tagged onto an animal, and the reader is installed at the control module; and the audio frequency device is provided for inputting an audio frequency.

The above and other objects, features and advantages of the present invention will become apparent from the following detailed description taken with the accompanying drawing.

DESCRIPTION OF THE PREFERRED EMBODIMENT

A preferred embodiment and its related drawings are used for describing the technical measures and performance of the invention, and it is noteworthy to point out that the embodiment and drawings are provided for illustrating the invention only, but not for limiting the scope of the invention.

Figure 1:
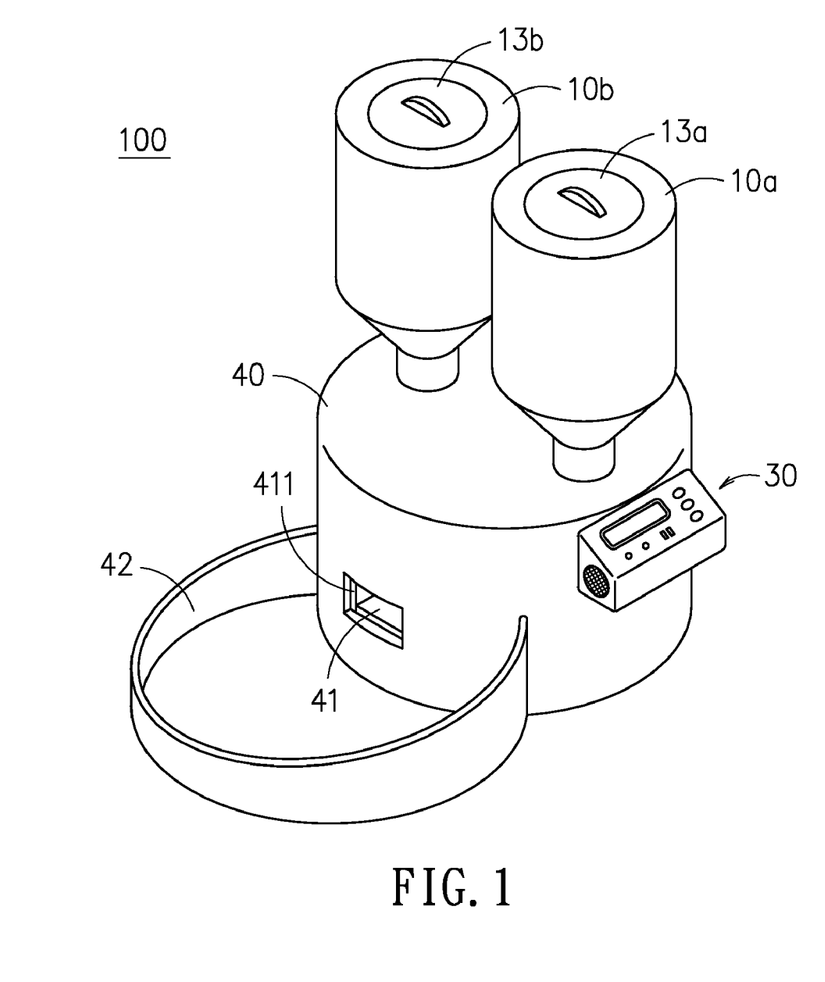
FIG. 1 is a perspective view of a structure in accordance with a preferred embodiment of the present invention.

In FIG. 1, the present invention provides an animal feeder 100, comprising: a plurality of fodder bins 10a, 10b for storing different fodders, and the plurality of fodder bins 10a, 10b are installed at the top of a casing 40, and the casing 40 includes a fodder mixing device (not shown in the figure) for controlling the output of fodder in the fodder bin 10a, 10b. In addition, the exterior of the casing 40 includes a control module 30 for controlling the operation of the overall animal feeder 100 based on an instruction.

Figure 2:
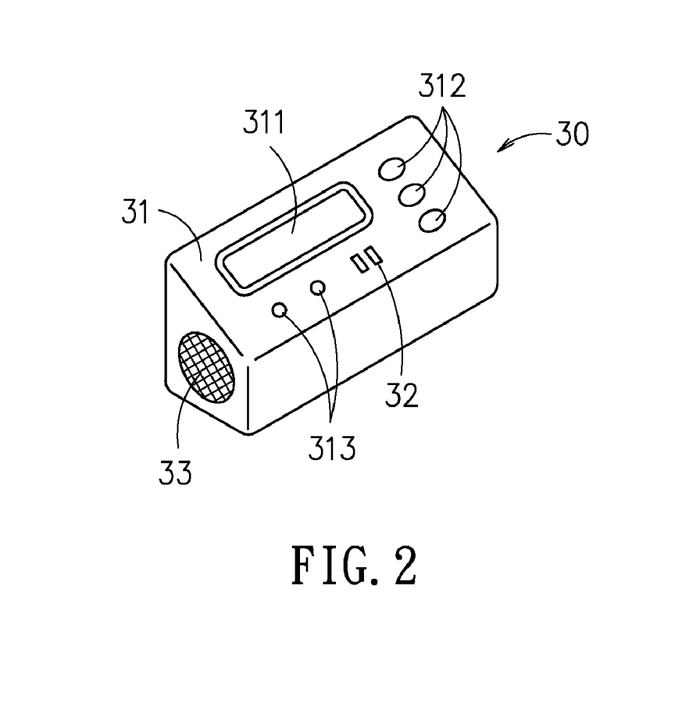
FIG. 2 is a perspective view of a layout of a control panel of a control module in accordance with a preferred embodiment of the present invention.
Figure 3:
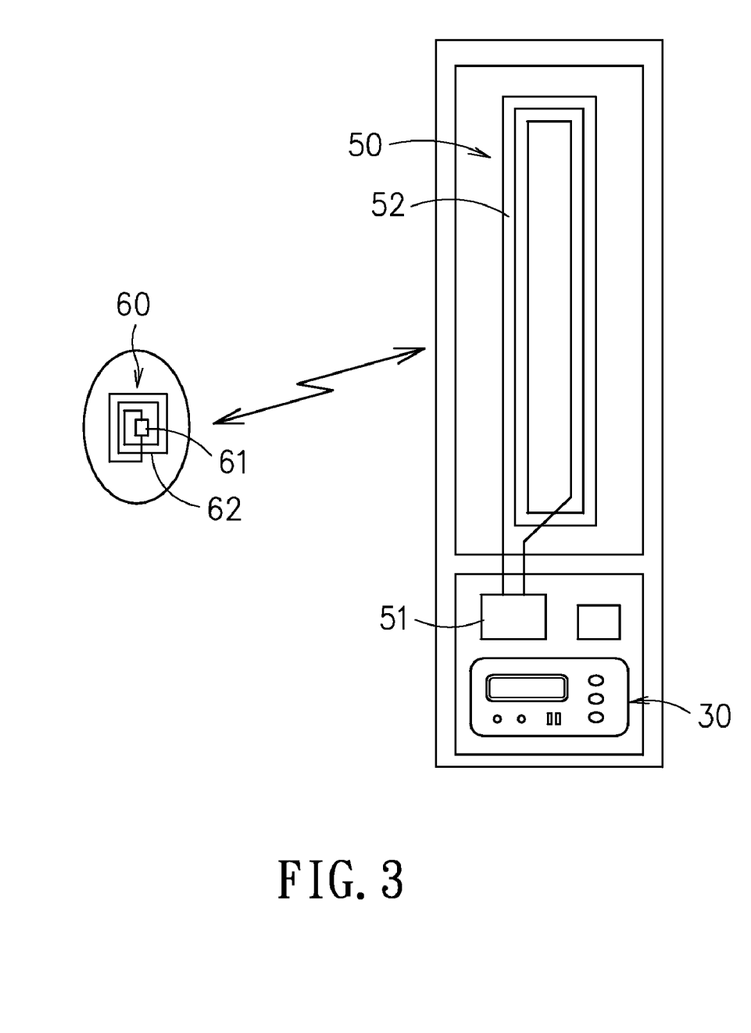
FIG. 3 is a schematic view of a structure of a radio frequency identification (RFID) system in accordance with a preferred embodiment of the present invention.

Referring to FIGS. 1 to 3, FIG. 1 shows a control module 30 installed at an appropriate position outside the casing 40, and FIG. 2 shows an enlarged view of the control module 30. The control module 30 includes an external control panel 31, and the control panel 31 includes a liquid crystal display panel 311, a plurality of control buttons 312 and a plurality of light emitting elements 313, and the liquid crystal display panel 311 is provided for displaying the status of an operation or a user's instruction. The plurality of control buttons 312 include an Enter key, a Back key and a Next key, etc and the control module 30 installs a processing unit and a timer (not shown in the figure), and the plurality of control buttons 312 set the time and cycle of outputting the fodder and input an instruction to the processing unit for the processing and execution to achieve the effect of outputting a fixed quantity of fodder at a fixed time. The light emitting element 313 is provided for displaying the power supply or alerting a low level of storage of fodder. It is noteworthy to point out that the liquid crystal display panel 311 and the light emitting element 313 of the external control panel 31 can be substituted by a graphic display panel, or the liquid crystal display panel 311, the plurality of control buttons 312 and the plurality of light emitting elements 313 can be substituted by a touch control display panel. In other words, the form of the external control panel 31 of the invention is not limited, but any equivalent device or means having the display and input function can be used.

Further, the control module 30 includes an audio frequency device comprised of a microphone 32 and a speaker 33, and the microphone 32 is electrically coupled to a sound recorder (not shown in the figure), so that a user can record a sound for calling a pet animal through the microphone 32 and output the sound through the speaker 33. For persons skilled in the arts, the microphone 32 and the speaker 33 can be substituted by another sound receiver or sound transmitter having the same function. The microphone and the speaker are used as one of the preferred embodiments only, but the layout of each component of the control panel 31 can be designed according to the actual design, and the drawings are provided for illustration only.

Figure 9:
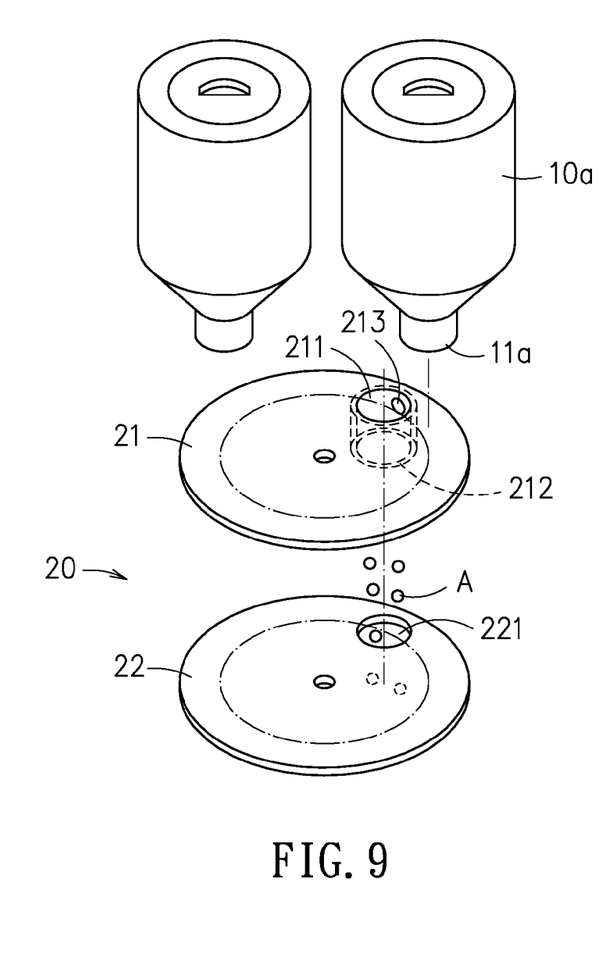

The control module 30 further includes a radio frequency identification (RFID) system as shown in FIG. 9, and the control module 30 installs a reader 50 comprising a microprocessor 51 and an antenna 52 for performing a wireless signal transmission with an electronic tag 60, and the electronic tag 60 comprises a chip 61 and an antenna 62. The electronic tag 60 is tagged on the pet animal for reading data in the electronic tag 60 to determine whether or not the pet animal wearing the electronic tag 60 is located near the animal feeder having the installed reader 50.

During a feeding time, the control module 30 issues a sound which is usually the name given by a pet owner to a pet animal, to call the pet animal. After the pet animal hears its name, the pet animal follows the sound and approaches a position next to the animal feeder 100. If the reader 50 reads the corresponding electronic tag 60, it means that the pet animal wearing the corresponding electronic tag 60 has approached the animal feeder 100, and thus the animal feeder 100 outputs the fodder. This arrangement can prevent the fodder from being eaten by other pet animals.

Figure 4:
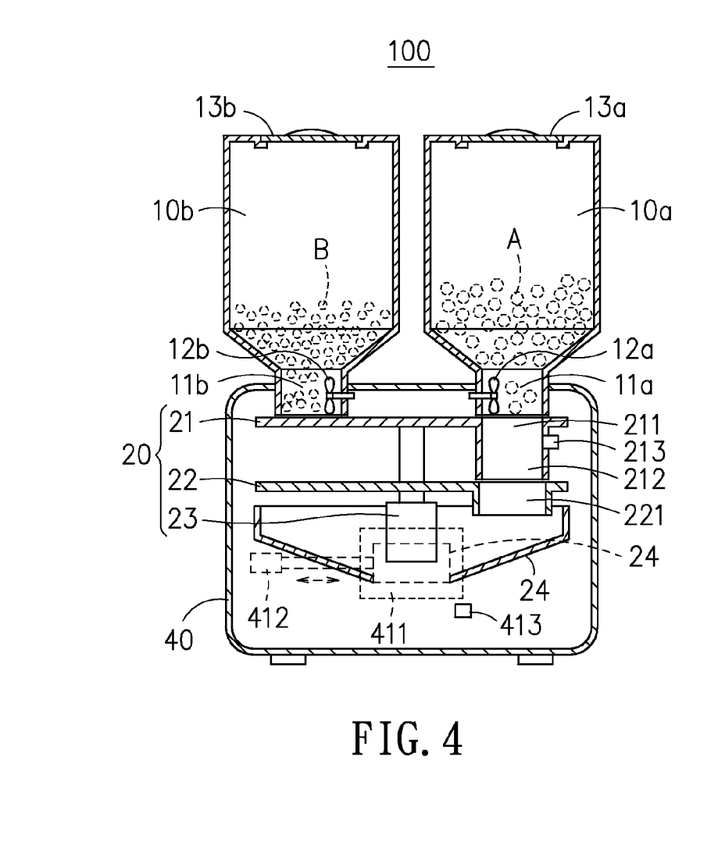
FIG. 4 is a schematic sectional front view of a structure in accordance with a preferred embodiment of the present invention.
Figure 5:
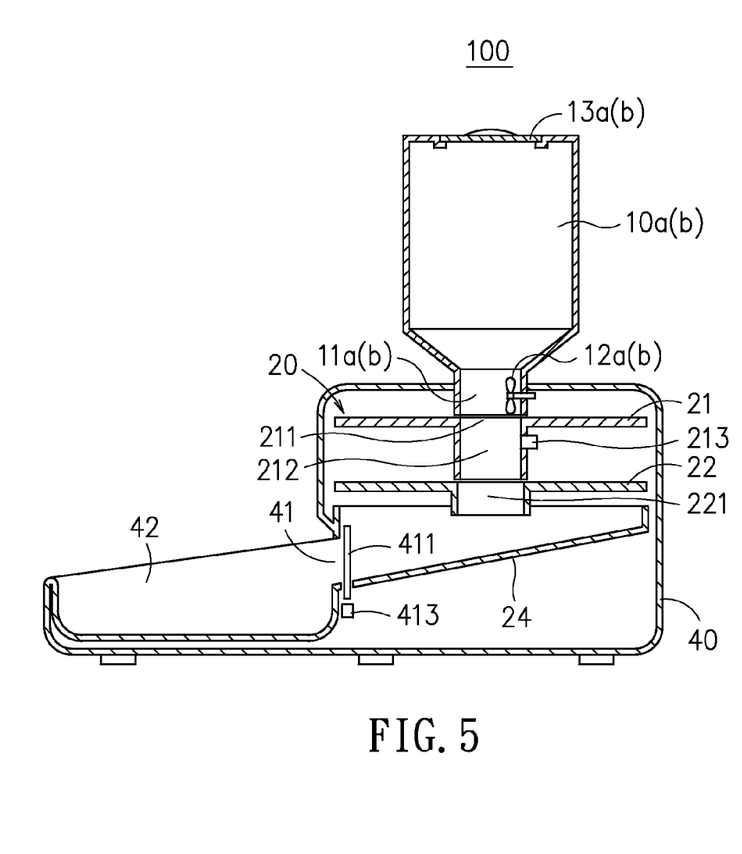
FIG. 5 is a schematic sectional side view of a structure in accordance with a preferred embodiment of the present invention.

Referring to FIGS. 1, 4 and 5, the devices related to the circuits of the fodder mixing device 20 and the control module 30 are installed in the casing 40, and the casing 40 includes a fodder outlet 41, a bowl-shaped container 42 disposed at the front side of the casing 40 and corresponding to the fodder outlet 41 for receiving the fodder delivered from the fodder outlet 41. A cover 411 is installed at the fodder outlet 41 and driven by a driving device 412 to move back and forth, and the driving device 412 is electrically coupled to the control module 30 for opening or closing the fodder outlet 41. A sensor 413 is installed at the fodder outlet 41 for detecting the position of the cover 411. The electric power required for the operation of the animal feeder 100 is supplied by a power supply device such as a battery or an external power supply (not shown in the figure).

The plurality of fodder bins 10a, 10b are provided for storing different fodders. For example, a principal fodder A is put into a fodder bin 10a and a snack fodder B is put into another fodder bin 10b. The bottom of the fodder bin 10a, 10b has a fodder outlet 11a, 11b, and the fodder outlet 11a, 11b has a blender 12a, 12b for mixing the fodders that pass through the fodder outlets 11a, 11b and preventing the fodder outlets 11a, 11b from being clogged. The top of the fodder bin 10a, 10b has a lid 13a, 13b for refilling the fodders and maintaining the sanitation of the fodders. The quantity of the fodder bins can be three or more, depending on the number of pet animals to be fed.

Figure 6:
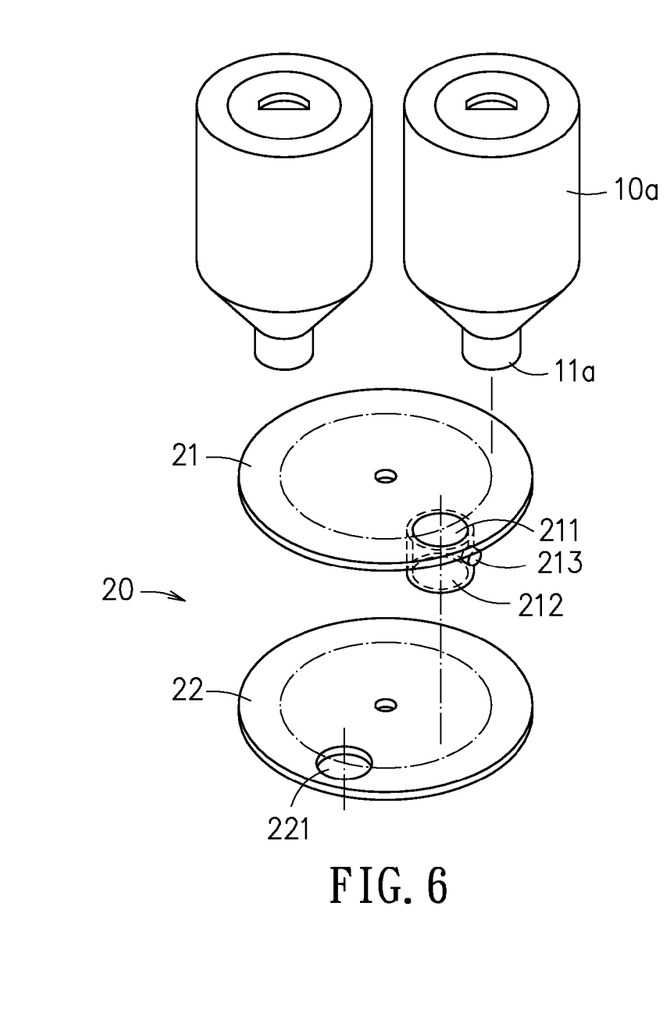
FIGS. 6 to 9 are schematic views of continuous movements of a turntable type fodder mixing device that controls a fodder to be outputted from one of the sides of a fodder bin in accordance with a preferred embodiment of the present invention.

Referring to FIGS. 4 to 6, the fodder mixing device 20 comprises: a first turntable 21, a second turntable 22 and a driving device 23, wherein the driving device 23 is composed of components such as a motor, a driving axle, a screw rod, a gear, or a gear rack work for driving the first turntable 21 and the second turntable 22 to rotate asynchronously. All of these components are prior arts, and thus will not be described here. For the illustration purpose, this preferred embodiment adopts a motor as the representative component of the driving device 23.

The first turntable 21 includes at least one fodder inlet 211, and the bottom of the fodder inlet 211 has a passage 212, and the passage 212 has a containing space. In this embodiment, the passage 212 is connected to the bottom of the first turntable 21 and interconnected with the fodder inlet 211, or the passage 212 is installed separately from the first turntable 21, as long as the passage 212 can be driven to rotate the first turntable 21 synchronously. The passage 212 is included between the first turntable 21 and the second turntable 22, and the bottom of the passage 212 is maintained at a predetermined distance from the second turntable 22, so that the passage 212 can be rotated synchronously with the first turntable 21 and the second turntable 22 will not be interfered. The fodder falling into the passage 212 will not be leaked from the bottom of the passage 212. In addition, the passage 212 includes a sensor 213 for detecting the level of fodder that drops into the passage 212 to estimate the quantity of fodder.

The second turntable 22 includes at least one hole 221 for passing the fodder. In this embodiment, a predetermined length is extended from the bottom of the hole 221 for successfully dropping the fodder onto the receiving board 24 below the hole 221, and the receiving board 24 is interconnected with the fodder outlet 41 of the casing 40, and thus the fodder is delivered from the fodder outlet 41 to the outside of the casing 40, and finally dropped into the bowl-shaped container 42. It is noteworthy to point out that when the fodder is not outputted, the hole 221 of the second turntable 22 is not interconnected with the passage 212 of the first turntable 21. In other words, the second turntable 22 can cover the bottom of the passage 212.

Figure 7:
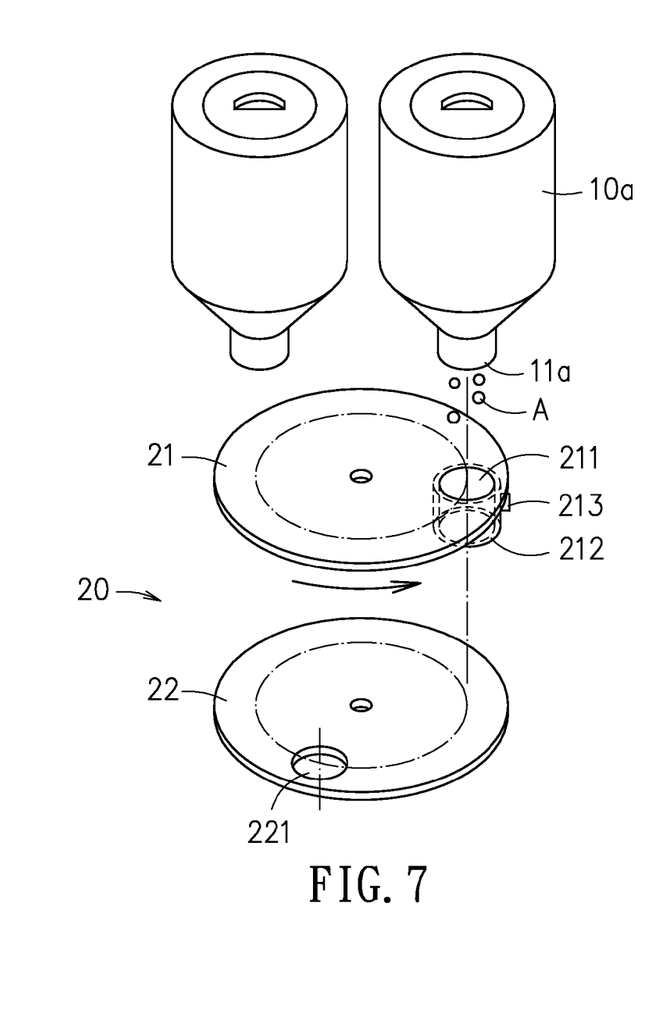
Figure 8:
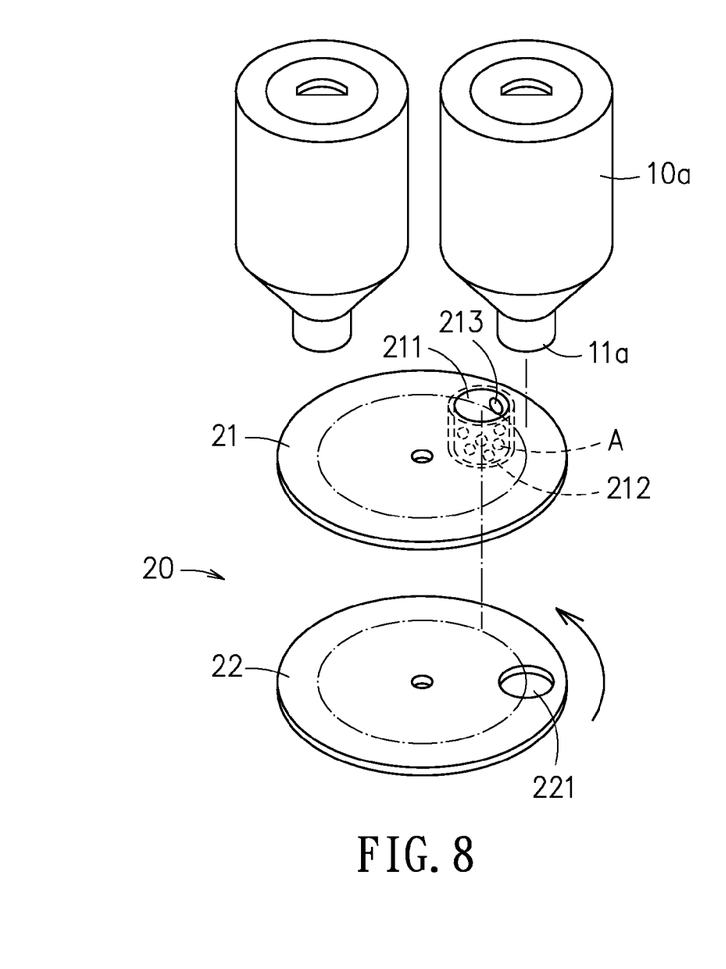

Referring to FIGS. 6 to 9 for the operation of the fodder mixing device, each of the components is separated along the axial direction for the purpose to show the relative positions of the components. In FIG. 6, the second turntable 22 covers the bottom of the passage 212, when the fodder is not outputted, such that the passage 212 will be in the form of a container. If the fodder is outputted from the fodder bin 10a, the first turntable 21 is driven to rotate first, so that the fodder inlet 211 of the first turntable 21 and the fodder outlet 11a of the fodder bin 10a are aligned with each other axially. In FIG. 7, the second turntable 22 needs not to rotate or rotates asynchronously, as long as the hole 221 is not interconnected with the passage 212. Therefore, a principal fodder A in the fodder bin 10a will drop into the passage 212. If the principal fodder A in the passage 212 has reached a predetermined height, the sensor 213 can detect the height. Now, the first turntable 21 is driven to rotate, so that the fodder inlet 211 is separated from the fodder outlet 11a of the fodder bin 10a. In FIG. 8, the fodder outlet 11a is shut to stop outputting the fodder, and then the second turntable 22 is driven to rotate, so that the hole 221 is interconnected with the passage 212. In FIG. 9, the principal fodder A in the passage 212 is passed through the hole 221 and dropped onto the receiving board 24 as shown in FIG. 5, and then delivered out from the fodder outlet 41, and finally dropped into the bowl-shaped container 42.

Similarly, if the fodder is outputted from another fodder bin 10b, the operation is the same as that of the aforementioned fodder bin 10a, and thus will not be described again here. Each of the foregoing driving steps in accordance with the present invention is control by the control module 30 as shown in FIG. 1.

In the fodder mixing device 20, a turntable is used for controlling the fodder, or other structures can be used as well. Referring to FIGS. 10 to 13 for another type of fodder mixing device 70, and the fodder mixing device 70 comprises a first board 71 and a second board 72, and both of the first board 71 and second board 72 have a plurality of fodder dropping openings 711, 712, 721, 722, and the first board 71 and the second board 72 are driven by a driving device (not shown in the figure) to move linearly back and forth. The driving device 70 is electrically coupled to the control module 30 (as shown in FIG. 1) and controlled by the control module 30 to drive the first board 71 and the second board 72 to move linearly back and forth and parallel with each other. A plurality of measuring cups 73a, 73b is installed between the first board 71 and the second board 72 for containing the fodder, and the measuring cups 73a, 73b respectively have a sensor 74a, 74b for detecting the quantity of fodder in the measuring cups 73a, 73b.

Figure 10:
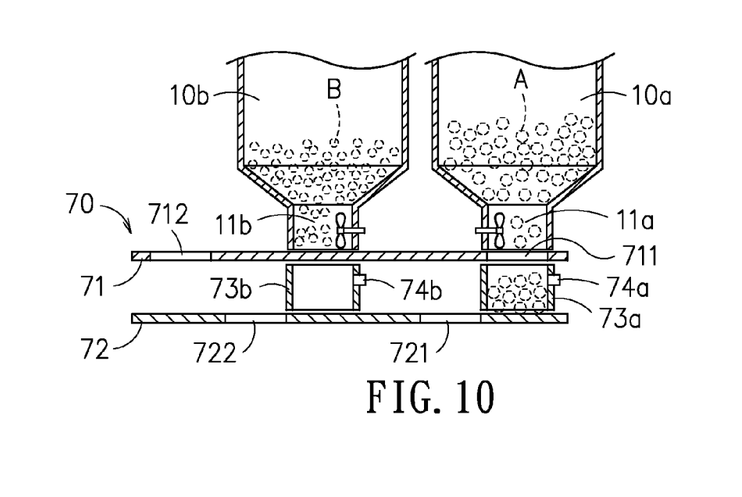
FIGS. 10 to 13 are schematic views of continuous movements of another fodder mixing device that controls a fodder to be outputted from different fodder bins in accordance with a preferred embodiment of the present invention.
Figure 11:
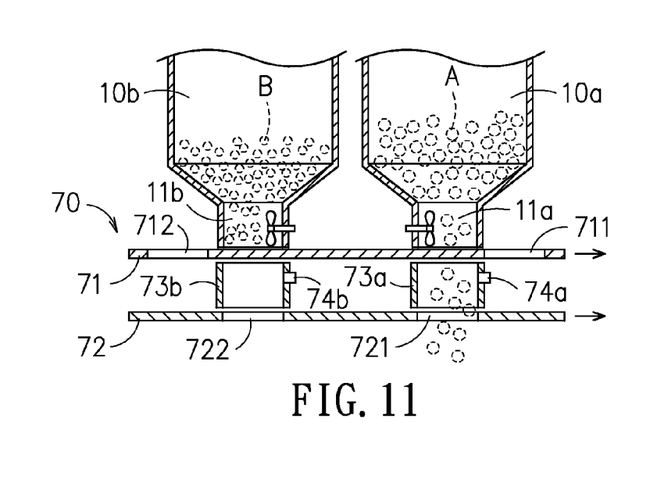

In FIG. 10, the movement of the first board 71 is controlled, such that one of the fodder dropping openings 711 is aligned with the fodder outlet 11a of the fodder bin 10a to allow the fodder A in the fodder bin 10a to drop into the measuring cup 73a. Now, the second board 72 covers the bottom of the measuring cup 73a. If the sensor 74a detects that the fodder A in the measuring cup 73a has reached a predetermined height, the first board 71 is controlled to move to a position such that the fodder dropping opening 711 is not aligned with the fodder outlet 11a (as shown in FIG. 11). As a result, the fodder outlet 11a is closed, and the fodder is not outputted.

In FIG. 11, the second board 72 is driven to move to a position such that one of the fodder dropping openings 721 is aligned with the bottom of the measuring cup 73a that contains the fodder A, and the fodder A drops from the measuring cup 73a onto the receiving board 24 as shown in FIG. 5 through the fodder dropping opening 721, and delivered to the fodder outlet 41, and finally dropped into the bowl-shaped container 42.

It is noteworthy to point out that the fodder outlet 11b of the fodder bin 10b remains closed all the time during the process of outputting the fodder A.

Figure 12:
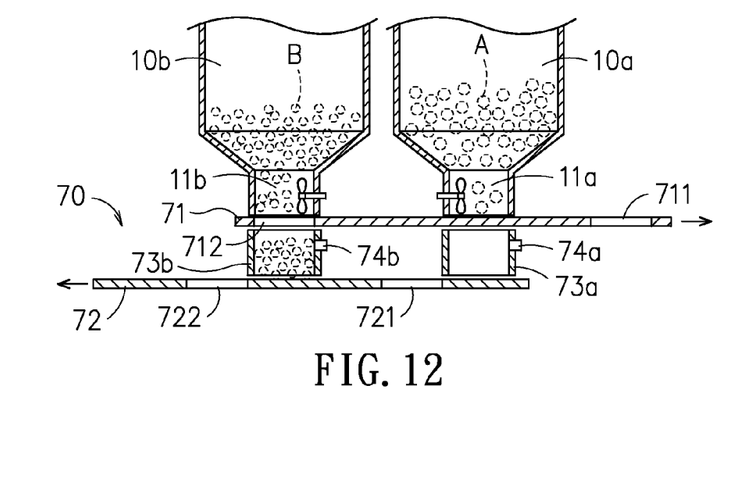
Figure 13:
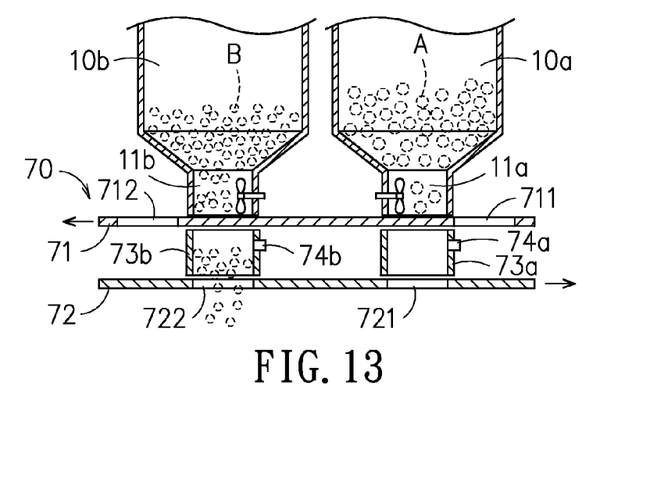

In FIG. 12, if the fodder B in the fodder bin 10b is outputted, the first board 71 is controlled to move to a position such that another fodder dropping opening 712 is aligned with the fodder outlet 11b of the fodder bin 10, and the fodder B in the fodder bin 10b drops into the measuring cup 73b. Now, the second board 72 covers the bottom of the measuring cup 73b. If the sensor 74a detects that the fodder A in the measuring cup 73a has reached a predetermined height, the first board 71 is controlled to move to a position such that the fodder dropping opening 712 is not aligned with the fodder outlet 11b (as shown in FIG. 13). As a result, the fodder outlet 11b is closed, and the fodder is not be outputted.

In FIG. 13, the second board 72 is driven to move to a position such that another fodder dropping opening 722 is aligned with the bottom of the measuring cup 73b that contains the fodder B, and the fodder B drops out of the measuring cup 73b onto the receiving board 24 as shown in FIG. 5 through the fodder dropping opening 722, and then delivered from the fodder outlet 41, and finally dropped into the bowl-shaped container 42.

Similarly, the fodder outlet 11a of the fodder bin 10a remains closed all the time during the process of outputting the fodder B.

It is noteworthy to point out that the shape of the first board 71 and the second board 72, and the quantity of the fodder dropping openings 711, 712, 721, 722 are not limited to the aforementioned arrangement. As far as the moving space allows, only one fodder dropping opening is required on the first board 71 and the second board 72, and the quantity of fodder bins can be one or more.

Figure 14:
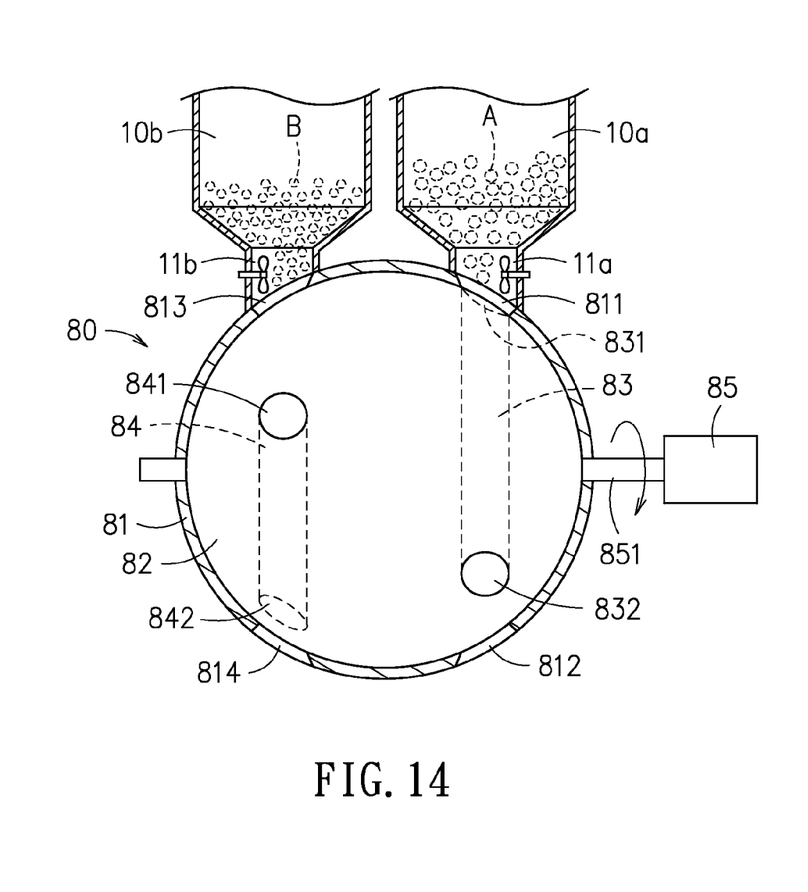
FIG. 14 is a schematic sectional front view of a structure of a fodder mixing device in accordance with a preferred embodiment of the present invention.
Figure 15:
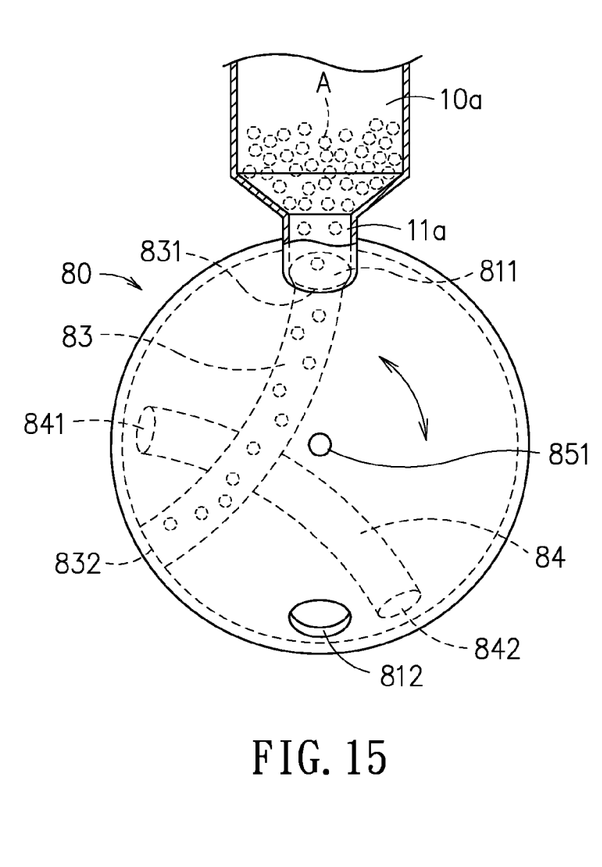
FIG. 15 is a schematic sectional side view of a structure of a fodder mixing device as depicted in FIG. 14.
Figure 16:
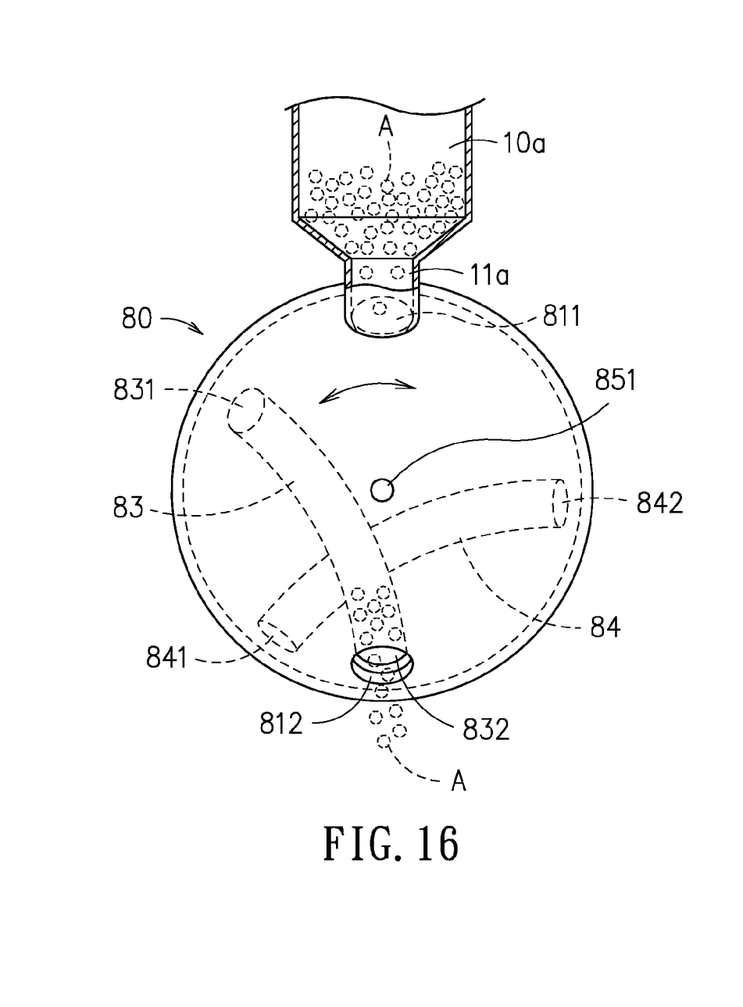
FIG. 16 is a schematic view of continuous movements of controlling a fodder to be outputted from one of the fodder bins of a fodder mixing device as depicted in FIG. 14.

Referring to FIGS. 14 and 15 for another type of fodder mixing device 80, the fodder mixing device 80 comprises a hollow spherical external casing 81, and the external casing 81 has a first top hole 811, a first bottom hole 812, a second top hole 813, and a second bottom hole 814. The first top hole 811 corresponds to the fodder outlet 11a of the fodder bin 10a, and the second top hole 813 corresponds to the fodder outlet 11b of the fodder bin 10b, and the first bottom hole 812 and the second bottom hole 814 correspond to the receiving board 24 as shown in FIG. 5. The external casing 81 includes an internal sphere 82, and the internal sphere 82 has a first passage 83 and a second passage 84, and both of the first passage 83 and the second passage 84 have a curvature (as shown in FIG. 15), and both ends of the first passage 83 and the second passage 84 penetrate through the internal sphere 82 to form holes 831, 832, 841, 842 on a surface of the internal sphere 82. The internal sphere 82 is connected to a motor 85 through a support axle 851, and the motor 85 drives the support axle 851 to rotate the internal sphere 82 in the external casing 81, but the external casing 81 will not rotate with the internal sphere 82.

IN FIGS. 14 and 15, if the fodder A of the fodder bin 10a is outputted, the internal sphere 82 is controlled to rotate, such that the hole 831 of the first passage 83 is aligned with the first top hole 811. Now, another hole 832 of the first passage 83 is closed by the external casing 81, and thus the fodder A can be dropped and stored in the first passage 83. Similarly, the first passage 83 can install a sensor (not shown in the figure) for detecting that the fodder A has reached a predetermined height, and the internal sphere 82 is controlled to rotate. In FIG. 26, after the hole 831 is separated from the first top hole 811, the first top hole 811, the internal sphere 82 is sealed to stop outputting the fodder. The internal sphere 82 is driven to rotate continuously, such that the hole 832 is aligned with the first bottom hole 812 of the external casing 81, the fodder A is dropped out from the first bottom hole 812 and onto the receiving board 24 as shown in FIG. 5, and outputted from the fodder outlet 41, and finally dropped into the bowl-shaped container 42. It is necessary to point out that the second passage 84 and both holes 841, 842 at its end remain closed during the process of outputting the fodder A.

The aforementioned method of driving the internal sphere 82 to rotate can be used for outputting the fodder B from the fodder bin 10b.

Figure 17:
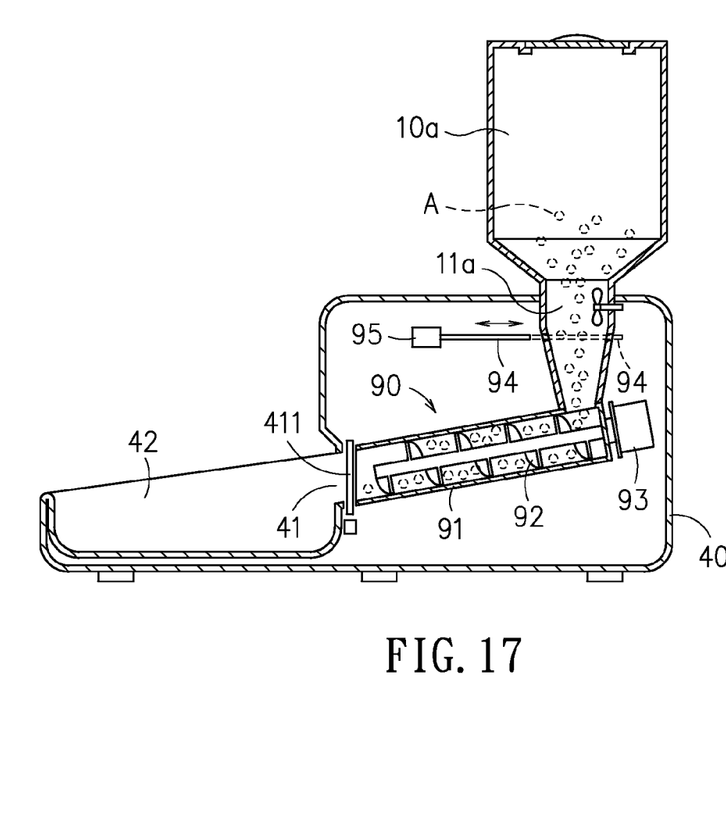
FIG. 17 is a schematic sectional side view of a fodder mixing device in accordance with a further preferred embodiment of the present invention.

Referring to FIG. 17 for a fodder bin 10a that operates together with a spiral pushing type fodder mixing device 90, and the fodder mixing device 90 includes a casing 91, and the casing 91 has a plurality of spiral pushing plates 92, and the spiral pushing plates 92 are driven to rotate by the motor 93. The fodder outlet 11a at the bottom of the fodder bin 10a is interconnected with the casing 91, so that the fodder A can be dropped into the casing 91. The fodder outlet 11a has a movable door 94 driven by the motor 95 to close the fodder outlet 11a and stop allowing the fodder A to drop into the casing 91. The motor 93 drives the spiral pushing plates 92 to push the fodder A towards the fodder outlet 41 and drop the fodder A into the bowl-shaped container 42. The two fodder bins 10a, 10b as shown in FIG. 1 respectively have a fodder mixing device 90, and fodders can be outputted from different fodder bins by controlling the control module 30. The two fodder bins 10a, 10b can share a fodder mixing device 90, and the control module 30 is used for controlling the movable door 94 to open or close, so as to selectively output the fodder from the fodder bin.

In summation of the description above, the structure of the present invention is used as follows:

1. A user can set an appropriate time and cycle for outputting the fodder. For example, breakfast, lunch and dinner are set as principal meals, and snacks are provided between the three principal meals and as a midnight snack. In the meantime, the user can set the quantity of the principal meals and the snacks.

2. A user can record an audio frequency for calling a pet animal. For example, a pet animal's name is called.

3. The user turns on the radio frequency identification (RFID) system of the electronic tag tagged on the pet animal.

4. At feeding time, the user turns on the audio frequency device to issue the calling sound.

5. After the pet animal hears the calling sound, the pet animal will normally move towards the sound, and thus will approach the feeder next to the position of issuing the sound.

6. When the pet animal approaches the feeder, the reader of the control module will read the electronic tag tagged on the animal for controlling the feeder to output the fodder. If the reader cannot read the corresponding electronic tag, then it means that the desired pet animal has not arrived yet. The pet animal may be far away from the feeder or cannot hear the calling sound due to other factors, and thus the feeder will not output any fodder. If the calling time exceeds a predetermined period, and the pet animal has not arrived, the volume of the calling sound will be increased and the sound will be played continuously for a certain time. If the pet animal still has not arrived, the audio frequency device will be turned off.

In summation of the description above, the animal feeder of the invention can control the output of a fixed quantity of fodder at a fixed time, issue a calling audio frequency, and supplies a fodder to a specific pet animal by using a radio frequency identification (RFID) system to prevent the pet animal from having unbalanced diet, insufficient or excessive quantity of food.

While the invention has been described by means of specific embodiments, numerous modifications and variations could be made thereto by those skilled in the art without departing from the scope and spirit of the invention set forth in the claims.

What is claimed is:

1. An animal feeder, comprising:
   at least one fodder bin, for storing at least one kind of fodder, and each said at least one fodder bin having a fodder outlet, for outputting the fodder from the at least one fodder bin;
   a fodder mixing device, for controlling the output of the fodder in each said at least one fodder bin comprising:
      a first turntable, having at least one fodder inlet, and a passage at the bottom of the fodder inlet comprising a containing space and a sensor for detecting the quantity of fodder in the passage;
      a second turntable, having at least one hole for receiving fodder from at least the passage; and
      a driving device, for rotating the first turntable and the second turntable asynchronously;
   a control module, for controlling the operation of the animal feeder;
   a radio frequency identification (RFID) system; and
   an audio frequency device, for outputting an audio frequency.

2. The animal feeder of claim 1, wherein the radio frequency identification (RFID) system comprises:
   at least one electronic tag, tagged onto an animal; and
   at least one reader, installed at the control module.

3. The animal feeder of claim 1, wherein the audio frequency device comprises:
   a sound transmitter, for outputting an audio frequency;
   a sound receiver, comprising a microphone and a sound recorder, and the microphone receiving the audio frequency and recording the sound frequency into the sound recorder.

4. The animal feeder of claim 1, wherein the control module comprises:
   a control panel, provided for a user to inputting a control instruction;
   a processing unit, for processing the control instruction; and
   a power supply device, for supplying electric power.

5. The animal feeder of claim 1, wherein the passage is coupled to the bottom of the first turntable, and interconnected to the fodder inlet of the first turntable.

6. The animal feeder of claim 1, wherein the fodder mixing device is installed in a casing, and the casing includes a fodder outlet.

7. The animal feeder of claim 6, wherein the fodder outlet includes a cover for covering the fodder outlet.

8. The animal feeder of claim 7, wherein the cover is driven by the driving device to move back and forth, such that the fodder outlet is closed or opened respectively.

9. The animal feeder of claim 8, wherein the driving device is electrically coupled to the control module, and the control module controls the driving device to drive the cover to move back and forth.

10. The animal feeder of claim 8, wherein the fodder outlet includes a sensor for detecting the position of the cover.

11. The animal feeder of claim 1, wherein the fodder outlet of the at least one fodder bin includes at least one blender.

* * * * *